United States Patent
Kondo et al.

(10) Patent No.: US 10,745,519 B2
(45) Date of Patent: Aug. 18, 2020

(54) POLYIMIDE RESIN, POLYIMIDE SOLUTION, FILM, AND METHOD FOR PRODUCING SAME

(71) Applicant: KANEKA CORPORATION, Osaka (JP)

(72) Inventors: Yasutaka Kondo, Otsu (JP); Hiroyuki Ushiro, Settsu (JP); Shoto Banya, Otsu (JP); Makoto Tawada, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 34 days.

(21) Appl. No.: 16/091,636

(22) PCT Filed: Apr. 7, 2017

(86) PCT No.: PCT/JP2017/014580
§ 371 (c)(1),
(2) Date: Oct. 5, 2018

(87) PCT Pub. No.: WO2017/175869
PCT Pub. Date: Oct. 12, 2017

(65) Prior Publication Data
US 2019/0153158 A1    May 23, 2019

(30) Foreign Application Priority Data

Apr. 7, 2016   (JP) .................... 2016-077504

(51) Int. Cl.
| C08G 73/10 | (2006.01) |
|---|---|
| C08J 5/18 | (2006.01) |
| B32B 27/28 | (2006.01) |
| C08L 79/08 | (2006.01) |

(52) U.S. Cl.
CPC ..... *C08G 73/1064* (2013.01); *C08G 73/1039* (2013.01); *C08G 73/1042* (2013.01); *C08G 73/1078* (2013.01); *C08J 5/18* (2013.01); *B32B 27/281* (2013.01); *B32B 2307/412* (2013.01); *B32B 2307/536* (2013.01); *B32B 2457/20* (2013.01); *C08J 2379/08* (2013.01); *C08L 79/08* (2013.01); *C08L 2203/16* (2013.01)

(58) Field of Classification Search
CPC ............ B32B 27/281; B32B 2307/412; B32B 2307/536; B32B 2457/20; C08J 2379/08; C08J 5/18; C08G 73/1039; C08G 73/1042; C08G 73/1064; C08G 73/1078
See application file for complete search history.

(56) References Cited

U.S. PATENT DOCUMENTS

| 2010/0317821 A1 | 12/2010 | Jung et al. |
| 2018/0086939 A1* | 3/2018 | Kato .................. C08G 73/1064 |

FOREIGN PATENT DOCUMENTS

| JP | 2010-70721 A | 4/2010 |
| JP | 5053384 B2 | 10/2012 |
| JP | 2016-4929 A | 1/2016 |
| JP | 2016-37048 A | 3/2016 |
| KR | 10-2013-0077948 A | 7/2013 |
| WO | WO 2015/125895 A1 | 8/2015 |
| WO | WO-2016158825 A1 * | 10/2016 ............... B32B 7/02 |

OTHER PUBLICATIONS

Machine translation of KR 20130077948. (Year: 2013).*
International Search Report dated May 23, 2017 in PCT/JP2017/014580, 2 pages.
English translation of the International Preliminary Report on Patentability and Written Opinion of the International Searching Authority dated Oct. 18, 2018 in PCT/JP2017/014580 filed Apr. 7, 2017, 9 pages.
"New Polyimide" Chapter 5, Japan Polyimide and Aromatic Polymers Research Group; Publisher: NTS Co., Ltd., Aug. 25. 2010, pp. 102-128 (with English translation).

* cited by examiner

*Primary Examiner* — John D Freeman
(74) *Attorney, Agent, or Firm* — Oblon, McClelland, Maier & Neustadt, L.L.P.

(57) ABSTRACT

A polyimide resin of the present invention contains at least one kind of an alicyclic acid dianhydride as an acid dianhydride component and contains at least one kind of a sulfonyl group-containing diamine as a diamine component. A film containing the polyimide resin of the present invention preferably has a yellowness of 3.0 or less, a tensile elastic modulus of 3.5 GPa or more, a pencil hardness of 4H or more, and a light transmittance of 60% or more at a wavelength of 400 nm. The polyimide resin of the present invention and the film of the present invention preferably have a glass transition temperature of 300° C. or higher.

10 Claims, No Drawings

POLYIMIDE RESIN, POLYIMIDE SOLUTION, FILM, AND METHOD FOR PRODUCING SAME

TECHNICAL FIELD

The present invention relates to a polyimide resin and a film which can be used as glass substitute materials.

TECHNICAL BACKGROUND

In recent years, along with rapid progresses of displays such as liquid crystals, organic ELs and electronic papers, and electronic devices such as solar cells, touch panels, there are increasing demands for reduction in thickness and weight and increase in flexibility of devices. These demands can be met by replacing a glass material with a plastic film material. From a point of view of mass productivity, a plastic film material that can be produced by a process of roll-to-roll is desired. In this process, it is necessary to use a material for which a scratch due to contact between a film and a film or between a film and a transport roller is unlikely to occur or a dimensional change due to a tension or the like during transportation is unlikely to occur, and a material having a high elastic modulus and a high strength is required. At the same time, hardness to an extent that a scratch does not occur in actual use as an application is also required.

In general, a polyimide film is known to have a high elastic modulus and a high strength as compared to a general-purpose plastic film such as a polyethylene terephthalate film, but is colored yellow or brown. This coloring is due to a high aromatic ring density and a charge transfer interaction, and is a factor that hinders the use of the polyimide film for a display material or the like that is required to be colorless and transparent. As means for colorlessizing polyimide, the use of an alicyclic monomer (Patent Document 1) and introduction of a fluorine substituent group (Non-Patent Document 1) are known. For example, Patent Document 2 discloses, as a method for obtaining a colorless polyimide, a polyimide film composed mainly of 4,4'-(4,4'-isopropylidenediphenoxy) bis (phthalic anhydride) and 2,2'-bis (trifluoromethyl)-4,4'-diaminobiphenyl.

RELATED ART

Patent Documents

Patent Document 1: Japanese Patent Laid-Open Publication No. 2010-70721.
Patent Document 2: Japanese Patent No. 5053384.

Non-Patent Document

Non-Patent Document 1: New Polyimide, Chapter 5, pages 102-128 (Editor: Japan Polyimide and Aromatic Polymers Research Group; Publisher: NTS Co., Ltd.; Publication Date: Aug. 25, 2010).

SUMMARY OF THE INVENTION

Problems to be Solved by the Invention

A film formed of a conventionally known transparent polyimide resin has a tensile elastic modulus of only about 3 GPa. A polyimide film having a further excellent mechanical strength is demanded. Further, a polyimide resin generally has a low solubility in a solvent, and that a process for producing a polyimide film is complicated is also a factor that hinders application to a roll-to-roll process. For the production of a polyimide film, in general, a polyamide acid solution which is a polyimide precursor is applied in a film form on a substrate; a solvent is removed by heating and imidization is performed by dehydrating and cyclizing a polyamide acid; and, in order to promote dehydration and cyclization, an imidization catalyst, a dehydrating agent, or the like is added to the polyamide acid solution. This method has problems in film formation such as that water generated by dehydration of the polyamide acid, the imidizing agent, the dehydrating agent and the like are likely to remain in the film, and that pot life management of the solution is required. Further, heating at a high temperature (for example, 300° C. or higher) is necessary in order to imidize the polyamide acid applied in a film form and to remove a residual catalyst, and the film may be colored due to heating and transparency may decrease. Therefore, there is a demand for a polyimide resin that is soluble in a solvent and does not require imidization by heating at a high temperature after film formation.

In view of the above-described situation, the present invention is intended to provide a polyimide resin that is colorless and transparent, is excellent in mechanical strength, and is soluble in a solvent.

Means for Solving the Problems

A polyimide of the present invention has a structure derived from an acid dianhydride and a structure derived from a diamine, and contains at least one kind of an alicyclic acid dianhydride as the acid dianhydride, and at least one kind of a sulfonyl group-containing diamine as the diamine. As the sulfonyl group-containing diamine, 3,3'diaminodiphenyl sulfone is particularly preferable. The polyimide preferably further contains a fluorine-containing aromatic diamine as a diamine component, and preferably further contains a fluorine-containing aromatic acid dianhydride as an acid dianhydride component.

An amount of the sulfonyl group-containing diamine with respect to a total amount of the diamine is preferably 20-50 mol %. An amount of the alicyclic acid dianhydride with respect to a total amount of the acid dianhydride is preferably 50 mol % or more.

The present invention relates to a polyimide solution obtained by dissolving the above polyimide resin in a solvent, and to a film containing the above polyimide resin. The film of the present invention is obtained by applying the polyimide solution on a substrate and removing the solvent.

For the film of the present invention, a yellowness is preferably 3.0 or less, a tensile elastic modulus is preferably 3.5 GPa or more, a pencil hardness is preferably 4H or more, a light transmittance at a wavelength of 400 nm is preferably 60% or more, and a glass transition temperature is preferably 300° C. or higher.

Effect of Invention

The film containing the polyimide resin of the present invention is transparent and is lightweight and flexible as compared to a glass plate, and thus, can be used as a substrate for a display such as a liquid crystal, an organic EL, or an electronic paper, and as a substrate for an electronic device such as a solar cell or a touch panel. Further, since the polyimide resin of the present invention is soluble, a polyimide film can be obtained by only applying a solution on a substrate and removing the solvent. Therefore, imidization by heating at a high temperature after applying the solution is not required, a process for producing a film can be simplified and reduction in transparency of the film caused by heating at a high temperature is suppressed, and a highly transparent film can be obtained.

MODE FOR CARRYING OUT THE INVENTION

A polyimide resin is generally obtained by obtaining a polyamide acid by condensing an acid dianhydride and a diamine and by dehydrating and cyclizing the polyamide acid. That is, a polyimide has a structure derived from an acid dianhydride and a structure derived from a diamine. A polyimide resin of the present invention contains a structure derived from a sulfonyl group-containing diamine as a structure derived from a diamine and contains a structure derived from an alicyclic acid dianhydride as a structure derived from an acid dianhydride.

Examples of the sulfonyl group-containing diamine include 3,3'-diaminodiphenyl sulfone, 3,4'-diaminodiphenyl sulfone, 4,4'-diaminodiphenyl sulfone, bis [4-(3-aminophenoxy) phenyl] sulfone, bis [4-(4-aminophenoxy) phenyl] sulfone, 4,4'-bis [4-(4-amino-α, α-dimethylbenzyl) phenoxy] diphenyl sulfone, 4,4'-bis [4-(4-aminophenoxy) phenoxy] diphenyl sulfone, and the like. Among these sulfonyl group-containing diamines, diphenyl sulfones such as 3,3'-diaminodiphenyl sulfone, 3,4'-diaminodiphenyl sulfone and 4,4'-diaminodiphenyl sulfone are preferable, and 3,3'-diaminodiphenyl sulfone is particularly preferable. By using a sulfonyl group-containing diamine as a diamine component, a polyimide having high transparency and high mechanical strength and being soluble can be obtained. Solubility of a polyimide refers to solubility during imidization of a polyamide acid solution and solubility in a solvent for film formation of a polyimide resin. "Having solubility during imidization" means that solid substances and turbidity do not occur when imidization is performed by adding a dehydrating agent and an imidization catalyst to a polyamide acid solution, and "having solubility in a solvent during film formation" means that solid substances and turbidity do not occur when a polyimide resin is dissolved in a solvent used in a film-forming dope.

A content of a sulfonyl group-containing diamine component in a total of 100 mol % of a diamine component of a polyimide is preferably 10-80 mol %, and more preferably 20-50 mol %. When the amount of the sulfonyl group-containing diamine is small, the solubility of the polyimide resin tends to decrease. As the amount of the sulfonyl group-containing diamine increases, the resin tends to be colored and the transparency (in particular, the transmittance in a short wavelength region of visible light) tends to decrease. By setting the amount of the sulfonyl group-containing diamine in the above range, a polyimide resin excellent in transparency and solubility can be obtained. An amount of 3,3'-diaminodiphenyl sulfone in a total of 100 mol % of the diamine component is particularly preferably 20-50 mol %.

The polyimide resin may have, as a structure derived from a diamine, a structure derived from a diamine other than a sulfonyl group-containing diamine. A diamine component other than a sulfonyl group-containing diamine is not particularly limited. However, the polyimide resin preferably contains a structure derived from a fluorine-containing aromatic diamine. Examples of the fluorine-containing aromatic diamine include 1,4-diamino-2-fluoro-henene, 1,4-diamino-2,3-difluorobenzene, 1,4-diamino-2,5-difluorobenzene, 1,4-diamino-2,6-difluorobenzene, 1,4-diamino-2,3,5-trifluorobenzene, 1,4-diamino, 2,3,5,6-tetrafluorobenzene, 1,4-diamino-2-(trifluoromethyl) henene, 1,4-diamino-2,3-bis (trifluoromethyl) benzene, 1,4-diamino-2,5-bis (trifluoromethyl) benzene, 1,4-diamino-2,6-bis (trifluoromethyl) benzene, 1,4-diamino-2,3,5-tris (trifluoromethyl) benzene, 1,4-diamino-2,3,5,6-tetrakis (trifluoromethyl) benzene, 2-fluorobenzidine, 3-fluorobenzidine, 2,3-difluorobenzidine, 2,5-difluorobenzidine, 2,6-difluorobenzidine, 2,3,5-trifluorobenzidine, 2,3,6-trifluorobenzidine, 2,3,5,6-tetrafluorobenzidine, 2,2'-difluorobenzidine, 3,3'-difluorobenzidine, 2,3'-difluorobenzidine, 2,2',3-trifluorobenzidine, 2,3,3'-trifluorobenzidine, 2,2',5-trifluorobenzidine, 2,2',6-trifluorobenzidine, 2,3',5-trifluorobenzidine, 2,3',6,-trifluorobenzidine, 2,2',3,3'-tetrafluorobenzidine, 2,2',5,5'-tetrafluorobenzidine, 2,2',6,6'-tetrafluorobenzidine, 2,2',3,3',6,6'-hexafluorobenzidine, 2,2',3,3',5,5',6,6'-octafluorobenzidine, 2-(trifluoromethyl) benzidine, 3-(trifluoromethyl) benzidine, 2,3-bis (trifluoromethyl) benzidine, 2,5-bis (trifluoromethyl) benzidine, 2,6-bis (trifluoromethyl) benzidine, 2,3,5-tris (trifluoromethyl) benzidine, 2,3,6-tris (trifluoromethyl) benzidine, 2,3,5,6-tetrakis (trifluoromethyl) benzidine, 2,2'-bis (trifluoromethyl) benzidine, 3,3'-bis (trifluoromethyl) benzidine, 2,3'-bis (trifluoromethyl) benzidine, 2,2',3-bis (trifluoromethyl) benzidine, 2,3,3'-tris (trifluoromethyl) benzidine, 2,2',5-tris (trifluoromethyl) benzidine, 2,2',6-tris (trifluoromethyl) benzidine, 2,3',5-tris (trifluoromethyl) benzidine, 2,3',6,-tris (trifluoromethyl) benzidine, 2,2',3,3'-tetrakis (trifluoromethyl) benzidine, 2,2',5,5'-tetrakis (trifluoromethyl) benzidine, 2,2',6,6'-tetrakis (trifluoromethyl) benzidine, and the like. By using a fluorine-containing aromatic diamine in addition to a sulfonyl group-containing diamine as the diamine component, the transparency and the solubility of the polyimide resin tend to be improved. Among these fluorine-containing aromatic diamines, from a point of view that a polyimide excellent in transparency and mechanical strength can be obtained, it is preferable to use a fluorine-containing aromatic diamine (fluoroalkyl-substituted benzidine) containing a biphenyl skeleton, such as 2,2-bis (trifluoromethyl) benzidine or 3,3'-bis (trifluoromethyl) benzidine.

A content of a fluorine-containing aromatic diamine component in a total of 100 mol % of the diamine component of the polyimide is preferably 20-90 mol %, more preferably 50-80 mol %, and even more preferably 55-75 mol % or more. An amount of a diamine containing a bis (trifluoromethyl) benzidine skeleton in a total of 100 mol % of the diamine component is preferably 50-80 mol %, and particularly preferably 55-75 mol %.

Examples of the alicyclic acid dianhydride include 1,2,3,4-cyclobutane tetracarboxylic acid dianhydride, 1,2,3,4-cyclopentane tetracarboxylic acid dianhydride, 1,2,4,5-cyclohexanetetracarboxylic acid dianhydride, and 1,1'-bicyclohexane-3,3',4,4'-tetracarboxylic acid-3,4,3',4'-dianhydride. Among these alicyclic acid dianhydrides, 1,2,3,4-cyclobutane tetracarboxylic acid dianhydride is particularly preferable. By using a sulfonyl group-containing diamine and an alicyclic acid dianhydride, a polyimide excellent in transparency and mechanical strength can be obtained.

A content of an alicyclic acid dianhydride component in a total of 100 mol % of the acid dianhydride component of the polyimide is preferably 50-80 mol %, more preferably 55-75 mol %, and even more preferably 65-75 mol %. When the amount of the alicyclic acid dianhydride is small, it tends to be difficult to achieve both good transparency and good mechanical strength in the polyimide resin. When the amount of the alicyclic acid dianhydride is large, the solubility of the polyimide resin tends to decrease. By setting the amount of the alicyclic acid dianhydride within the above range, a polyimide resin excellent in transparency and mechanical strength and excellent in solubility can be obtained. An amount of 1,2,3,4-cyclobutane tetracarboxylic acid dianhydride in a total of 100 mol % of the acid dianhydride component is particularly preferably 50-80 mol %.

The polyimide resin may have, as a structure derived from an acid dianhydride, a structure derived from an acid dianhydride other than an alicyclic acid dianhydride. An acid dianhydride component other than an alicyclic acid dianhydride is not particularly limited. However, the polyimide resin preferably contains a structure derived from a fluorine-containing aromatic acid dianhydride. Examples of the fluorine-containing aromatic acid dianhydride include 2,2-bis (3,4-dicarboxyphenyl)-1,1,1,3,3,3-hexafluoropropane dianhydride, 2,2-bis {4-[4-(1,2-dicarboxy) phenoxy] phenyl}-1, 1,1,3,3,3-hexafluoropropane dianhydride, and the like. By using a fluorine-containing aromatic acid dianhydride in addition to an alicyclic diamine as the acid dianhydride component, the transparency and the solubility of the polyimide resin tend to be improved.

A content of a fluorine-containing aromatic acid dianhydride component in a total of 100 mol % of the acid dianhydride component of the polyimide is preferably 20-50 mol %, and more preferably 25-45 mol %. When the amount of the fluorine-containing aromatic acid dianhydride is small, the solubility of the polyimide resin tends to decrease. When the amount of the fluorine-containing aromatic acid dianhydride is large, the mechanical strength tends to decrease. By setting the amount of the fluorine-containing aromatic acid dianhydride within the above range, a polyimide resin excellent in transparency and mechanical strength and excellent in solubility can be obtained. An amount of 2,2-bis (3,4-dicarboxyphenyl)-1,1,1,3,3,3-hexafluoropropane dianhydride in a total of 100 mol % of the acid dianhydride component is particularly preferably 25-45 mol %.

As described above, the polyimide is obtained by dehydrating and cyclizing the polyamide acid (also referred to as a polyamic acid) which is a polyimide precursor.

A method for producing the polyamic acid is not particularly limited, and any commonly known method can be used. For example, a polyamide acid solution is obtained by dissolving an acid dianhydride and a diamine at substantially equimolar amounts (a molar ratio in a range of 95:100-105: 100) in an organic solvent and stirring the resulting solution under a controlled temperature condition until polymerization of the acid dianhydride and the diamine is completed. The polyamide acid solution is usually obtained at a concentration of 5-35 wt % (weight %), and preferably 10-30 wt %. When the concentration is in this range, appropriate molecular weight and viscosity are obtained. A polymerization method of the acid dianhydride and the diamine is not particularly limited, and any one of commonly known methods and any combination thereof can be used. In order to suppress ring opening of the acid dianhydride, a method in which the acid dianhydride is added to the diamine is preferable. Further, when multiple kinds of diamines and multiple kinds of acid dianhydrides are added, the addition may be performed at once or may be divided into multiple times. One of characteristics of the polymerization method for the polymerization of the polyamic acid is the order of the addition of the monomers, and various physical properties of the resulting polyimide can be controlled by adjusting the order of the addition of the monomers.

The organic solvent used for the polymerization of the polyamide acid is not particularly limited and any solvent can be used as long as the solvent does not react with the diamine to be used and with the acid dianhydride to be used and can dissolve the polyamide acid. Examples of the organic solvent include urea-based solvents such as methyl urea and N,N-dimethylethylurea; sulfoxide-based or sulfone-based solvents such as dimethyl sulfoxide, diphenyl sulfone, and tetramethyl sulfone; amide-based solvents such as N,N-dimethylacetamide (DMAc), N,N-dimethylformamide (DMF), N,N'-diethylacetamide, N-methyl-2-pyrrolidone (NMP), γ-butyrolactone, and hexamethylphosphoric acid triamide; halogenated alkyl-based solvents such as chloroform, and methylene chloride; aromatic hydrocarbon-based solvents such as benzene, and toluene; and ether-based solvents such as tetrahydrofuran, 1,3-dioxolane, 1,4-dioxane, dimethyl ether, diethyl ether, and p-cresol methyl ether. Usually, these solvents are each used independently, or, when necessary, two or more of these solvents may be appropriately combined and used. From a point of view of solubility and polymerization reactivity of the polyamide acid, DMAc, DMF, NMP, and the like are preferably used.

A polyimide film may be produced using a polyamide acid (also referred to as a polyamic acid) (hereinafter, in the present specification, the term "polyamide acid" may be used synonymously with "polyimide precursor"), and, when a polyimide is soluble in a solvent, may be produced using a solution thereof, and is not particularly limited.

A polyimide film can be obtained by dehydration and cyclization of a polyamide acid and by film formation. An example of a method for producing a polyimide film from a polyamide acid solution is a method in which a polyimide is obtained by imidizing a polyamide acid in a polyamide acid solution, and a film-forming dope containing a polyimide solution is cast on a support and is dried on the support and is peeled off.

An example of a method for preparing a polyimide solution from a polyamide acid solution is a method in which a dehydrating agent, an imidization catalyst and the like are added to a polyamide acid solution, and imidization is caused to proceed in the solution. In order to promote progress of the imidization, the polyamide acid solution may be heated. A polyimide solution obtained by the imidization of the polyamide acid may be used as it is as a film-forming dope. It is also possible that the polyimide solution obtained by the imidization of the polyamide acid and a poor solvent are mixed to precipitate and collect a polyimide resin as a solid substance and a polyimide solution is obtained again by dissolving the polyimide resin in a solvent which is to be used for the formation of a film. A method in which a polyimide resin is once isolated as a solid substance allows impurities generated during synthesis of a precursor and remaining dehydrating agent and imidization catalyst and the like to be washed and removed with a poor solvent, and further allows a solvent suitable for a film formation condition to be used, and thus, is preferable.

As the above imidization catalyst, a tertiary amine can be used. The tertiary amine is preferably a heterocyclic tertiary amine. Preferred specific examples of the heterocyclic tertiary amine include pyridine, picoline, quinoline, isoquinoline, and the like. As a dehydrating agent, an acid anhydride is used. Specifically, acetic anhydride, propionic anhydride, n-butyric anhydride, benzoic anhydride, trifluoroacetic anhydride and the like are preferable. An amount of an imidization agent to be added, with respect to an amide group of a polyamide acid, is preferably 0.5-5.0 molar equivalents, more preferably 0.6-2.5 molar equivalents, and even more preferably 0.7-2.0 molar equivalents. An amount of a dehydrating agent to be added, with respect to an amide group of a polyamide acid, is preferably 0.5-10.0 molar equivalents, more preferably 0.7-7.0 molar equivalents, and even more preferably 1.0-5.0 molar equivalents. When an imidization catalyst or a dehydrating agent is added to a polyamide acid solution, the imidization catalyst or the dehydrating agent may be directly added, or a solution obtained by dissolving the imidization catalyst or the dehydrating agent in a solvent may be added. In order to suppress gel formation due to local rapid progress of an imidization reaction, it is preferable to mix a solution obtained by diluting an imidization catalyst or a dehydrating agent with a solvent into a polyamide acid solution.

As the poor solvent for precipitating the polyimide resin, a solvent that is a poor solvent for the polyimide resin and is miscible with a solvent dissolving the polyimide resin can be used. For example, water, methyl alcohol, ethyl alcohol, isopropyl alcohol (2-propyl alcohol), ethylene glycol, triethylene glycol, 2-butyl alcohol, 2-hexyl alcohol, cyclopentyl alcohol, cyclohexyl alcohol, phenol, t-butyl alcohol, and the like can be used. Among the above alcohols, alcohols such as isopropyl alcohol, 2-butyl alcohol, 2-pentyl alcohol, phenol, cyclopentyl alcohol, cyclohexyl alcohol, and t-butyl alcohol are preferable from a point of view that stability and an imidization ratio of the polyimide resin after isolation are not decreased, and isopropyl alcohol is particularly preferable.

A solid content concentration of the polyimide solution when the polyimide solution and the poor solvent are mixed is not particularly limited as long as the polyimide solution has a viscosity that allows stirring to be performed. However, from a point of view of reducing a particle size of the precipitated polyimide resin, the solid content concentration is preferably low. On the other hand, when the polyimide resin solution is too dilute, a large amount of the poor solvent is required in order to precipitate the polyimide resin. From these points of view, it is preferable to mix the polyimide solution and the poor solvent after performing dilution such that the solid content concentration of the polyimide resin solution is preferably 2-15 wt %, and more preferably 3-10 wt %. Examples of mixing methods include: a method in which a polyimide solution is charged in a poor solvent solution; a method in which a poor solvent is charged in a polyimide solution; a method in which a poor solvent and a polyimide solution are simultaneously mixed; and the like. An amount of the poor solvent to be used is preferably equal to or more than that of the polyimide resin solution, and more preferably 2-3 times that of the polyimide resin solution. Since a small amount of an imidizing agent or a dehydrating agent may remain in the precipitated polyimide resin, it is preferable to wash the precipitated polyimide resin several times with the poor solvent, particularly an alcohol solvent such as isopropyl alcohol.

It is preferable to remove the poor solvent by drying the precipitated and washed polyimide resin. A drying method may be vacuum drying or hot air drying. In order to completely remove the solvent contained in the resin, vacuum drying is desirable. A temperature in a case of heating is preferably 100-200° C., and particularly preferably 120-180° C. A polyimide resin solid substance is a solid substance that can include various forms such as a powdery form and a flake form, and an average particle size thereof is preferably 5 mm or less, more preferably 3 mm or less, and particularly preferably 1 mm or less.

A weight average molecular weight of the polyimide is preferably 5,000-500,000, more preferably 10,000-300,000, and even more preferably 30,000-200,000. When the weight average molecular weight is within this range, a sufficient mechanical property can be easily obtained when a coating film or a film is formed. Further, the viscosity of the polymer solution becomes appropriate, handleability can be ensured, and a coating film or a film having a smooth surface and a uniform thickness can be easily obtained. The molecular weight referred to here is a value of polyethylene oxide (PEO) conversion by gel permeation chromatography (GPC). The molecular weight can be adjusted by a molar ratio of the diamine and the acid dianhydride or a reaction condition, or the like.

A polyimide solution is obtained by dissolving a polyimide resin solid substance in an appropriate solvent. As a solvent dissolving a polyimide resin, in general, an amide-based solvent is used. As a solvent dissolving the polyimide resin of the present invention, amide-based solvents or solvents other than amide-based solvents may be selected according to a state of a polyimide solution or a film formation environment.

The viscosity of the polyimide solution may be appropriately selected according to a thickness of a film and a coating environment, and is preferably 0.5 Pa·s-30 Pa·s, and more preferably 1.0 Pa·s-20 Pa·s. When the viscosity of the polyimide solution is within this range, sufficient film thickness accuracy can be ensured. Further, a portion that is locally dried immediately after coating is unlikely to occur, and poor appearance such as a gel defect can be suppressed. The solid content concentration of the polyimide solution is preferably 5-50 wt %, and more preferably 8-30 wt %. When the solid content concentration of the polyimide solution is within this range, a film having a uniform thickness can be easily obtained, storage stability can also be developed, and possibility of occurrence of unevenness during film formation can be reduced.

In order to impart processing characteristics and various functionalities to a polyimide film, an organic or inorganic low molecular or high molecular compound may be blended into the polyimide solution. For example, a cross-linking agent, a dye, a surfactant, a leveling agent, a plasticizer, fine particles, a sensitizer and the like can be used. The fine particles include organic fine particles such as polystyrene and polytetrafluoroethylene particles, inorganic particles such as colloidal silica, carbon, and layered silicate particles, and the like. These fine particles may have porous structures or hollow structures. Further, functions or forms of the fine particles include pigments, fillers, fibers and the like.

As a support for coating a film-forming dope, for example, a metal substrate such as a glass substrate or an SUS, various metal belts, plastic films such as polyethylene terephthalate, polycarbonate, polyacrylate, polyethylene naphthalate and triacetyl cellulose films, and the like can be used. When a plastic film is used as a support, a material that does not dissolve in an organic solvent of a film-forming dope is appropriately selected.

A thickness of a polyimide film is not particularly limited and may be appropriately set according to an intended use. The thickness of the polyimide film is, for example, about 5-100 μm. From a point of view that both a self-supporting property and flexibility can be achieved and a highly transparent film can be obtained, the thickness of the polyimide film is preferably 20-90 μm, and more preferably 30-80 μm.

A yellowness (YI) of the film of the present invention is preferably 3.0 or less, more preferably 2.5 or less, even more preferably 2.0 or less, and particularly preferably 1.5 or less. When the yellowness is 3.0 or less, the film is not colored yellow and can be suitably used as a film for a display or the like. A total light transmittance of the film of the present invention is preferably 88% or more, more preferably 90% or more, even more preferably 91% or more, and particularly preferably 92% or more. A light transmittance of the film at a wavelength of 400 nm is preferably 60% or more, more preferably 70% or more, even more preferably 81% or more, particularly preferably 84% or more, and most preferably 86% or more.

A tensile elastic modulus of the film of the present invention is preferably 3.5 GPa or more, more preferably 4.5 GPa or more, and particularly preferably 5.0 GPa or more. When the tensile elastic modulus is larger than 3.5 GPa, good handleability during roll-to-roll transport is obtained. On the other hand, when the tensile elastic modulus is excessively large, there is an adverse effect such as spring back. Therefore, the tensile elastic modulus of the film is preferably 10 GPa or less.

A glass transition temperature (Tg) of the film of the present invention is preferably 250° C. or higher, more preferably 300° C. or higher, even more preferably 320° C. or higher, and particularly preferably 340° C. or higher. When the glass transition temperature is 250° C. or higher, a heat treatment temperature can be raised, and this is preferable from a point of view of productivity and the like. The glass transition temperature refers to an inflection point of a storage elastic modulus measured by a dynamic viscoelasticity analysis (DMA).

A pencil hardness of the film of the present invention is preferably 4H or more, more preferably 5H or more, and particularly preferably 6H or more. Although it is known that scratch resistance can be enhanced by laminating a hard coat layer on the film, influence of the film as a base of the hard coat layer cannot be completely eliminated. When the film has a pencil hardness of 4H or more, scratching can be prevented even when the film is used in a roll-to-roll process.

In the present invention, a film that has the above characteristics and is excellent in transparency, mechanical strength and heat resistance can be obtained by using the above polyimide resin as a material of the film. The polyimide resin of the present invention, in a case where a film having a thickness of 30 μm is produced, preferably has a yellowness of 3.0 or less, a tensile elastic modulus of 3.5 GPa or more, a glass transition temperature of 300° C. or higher, and a pencil hardness of 4H or more.

By using a transparent film having the above characteristics, it is possible to achieve reduction in weight of and impart flexibility to a display such as a liquid crystal, an organic EL, and an electronic paper, and an electronic device such as a solar cell or a touch panel. Further, since the film of the present invention is suitable also for a roll-to-roll process, the film can also contribute to productivity of the film itself and productivity of a process such as formation of an element on the film.

EXAMPLES

In the following, based on Examples and Comparative Examples, the present invention is further specifically described. The present invention is not limited to the following Examples.

[Evaluation Methods]
(Solubility of Polyimide Resin)
When imidization was performed by adding pyridine as an imidization catalyst and acetic anhydride as a dehydrating agent to an N,N-dimethylformamide (DMF) solution of an polyamide acid having a solid content concentration of 20 wt %, those that did not solidify at the time of imidization were regarded as being soluble (solubility evaluation: OK), and those that solidified at the time of imidization were regarded as being non-soluble (solubility evaluation: NG).

(Tensile Elastic Modulus)
A measurement was performed according to ASTM D882 using AUTOGRAPH AGS-J manufactured by Shimadzu Corporation. (Sample measurement range: width: 15 mm; distance between jaws: 100 mm; tensile speed: 200 min/min; measurement temperature: 23° C.). Samples moisture-conditioned by being allowed to stand still at 23° C. and 55% RH for one week were measured.

(Yellowness)
An average value of results measured at 5 places of an 18 cm square sample using HANDY COLORIMETER NR-3000 manufactured by Nippon Denshoku Industries Co., Ltd. was taken as the yellowness of the film.

(Pencil Hardness)
The pencil hardness of the film was measured according to "8.4.1 Pencil Scratch Test" of JIS K-5400-1990.

(Light Transmittance)
A light transmittance at 200-800 nm of the film was measured using an ultraviolet-visible near-infrared spectrophotometer (V-650) manufactured by JASCO Corporation, and a light transmittance at a wavelength of 400 nm was used as an indicator.

(Measurement of Total Light Transmittance)
A measurement was performed according to a method described in JIS K7105-1981 using an integrating sphere type haze meter 300A manufactured by Nippon Denshoku Industries Co., Ltd.

(Measurement of Glass Transition Temperature)
A dynamic viscoelasticity measurement was performed at a measuring jig interval of 20 mm using DMS-200 manufactured by Seiko Denshi Kogyo Co., Ltd., and an inflection point of a storage elastic modulus was taken as the glass transition temperature.

Example 1

(Synthesis of Polyimide)
320.0 g of DMF was charged into a 2 L separable flask and was stirred under a nitrogen atmosphere. Thereto, 30.9 g of 2,2'-bis (trifluoromethyl) benzidine (TFMB), 10.3 g of 3,3'-diaminodiphenyl sulfone (3,3'-DDS), 17.6 g of 1,2,3,4-cyclobutane tetracarboxylic acid dianhydride (CBDA), and 21.2 g of 2,2-bis (3,4-dicarboxyphenyl)-1,1,1,3,3,3-hexafluoropropane dianhydride (6FDA) were added, and the mixture was stirred under a nitrogen atmosphere for 10 hours, and a polyamide acid solution (polyimide precursor) having a solid content concentration of 20% and a viscosity of 1100 poises at 23° C. was obtained. 35.6 g of pyridine as an imidization catalyst was added to the polyimide precursor and was completely dispersed. Thereafter, 45.9 g of acetic anhydride was added, the mixture was stirred at 120° C. for 2 hours, and was then cooled to a room temperature. While the solution was stirred, 1 L of isopropyl alcohol (IPA) was charged at a rate of 2-3 drops/second to precipitate polyimide. Thereafter, suction filtration was performed using a Kiriyama funnel and washing was performed using 500 g of IPA. The washing operation was repeated four times and then drying was performed in a vacuum oven set at 120° C. for 12 hours, and a polyimide resin was obtained.

(Preparation of Polyimide Film)

The polyimide resin was dissolved in DMF and a polyimide solution having a solid content concentration of 13% was obtained. The polyimide solution was applied on an alkali-free glass plate using a comma coater, and was dried at 40° C. for 10 minutes, at 80° C. for 30 minutes, at 150° C. for 30 minutes and at 200° C. for 1 hour under an air atmosphere, and a polyimide film having a thickness of 30 µm was obtained.

Example 2

A polyimide film having a thickness of 30 µm was prepared from a polyimide solution in the same manner as in Example 1 except that the charge ratio of the acid dianhydrides (CBDA and 6FDA) was changed as shown in Table 1.

Comparative Example 1

(Synthesis of Polyimide Precursor)

328.0 g of DMF was charged into a 2 L separable flask and was stirred under a nitrogen atmosphere. Thereto, 37.5 g of TFMB and 34.4 g of 3,3',4,4'-biphenyltetracarboxylic acid dianhydride (BPDA) were added, and the mixture was stirred under a nitrogen atmosphere for 19 hours, and a polyimide precursor having a solid content concentration of 18% and a viscosity of 1900 poises at 23° C. was obtained.

(Preparation of Polyimide Film)

A separately prepared imidization accelerating liquid (28.4 g of acetic anhydride, 6.8 g of β-picoline and 4.8 g of DMF) was added to 100 g of the polyimide precursor, and then, the mixture was immediately stirred using a glass rod. This solution was applied to a PET film using a comma coater, and was dried at 40° C. for 5 minutes, at 80° C. for 10 minutes, and at 150° C. for 10 minutes under an air atmosphere. The obtained film was peeled off from the PET film and was fixed on a metal pin frame and was fired at 200° C. for 30 seconds, at 250° C. for 30 seconds, at 300° C. for 30 seconds, and at 350° C. for 2 minutes in an air atmosphere, and a polyimide film having a thickness of 30 µm was obtained.

Comparative Example 2

A polyimide film having a thickness of 30 µm was prepared from a polyimide solution in the same manner as in Example 1 except that only 6FDA was used as an acid dianhydride and only TFMB was used as a diamine.

Comparative Example 3

A polyimide film having a thickness of 30 µm was prepared from a polyamide acid solution in the same manner as in Comparative Example 1 except that BPDA and 6FDA were used as diamines.

Comparative Example 4

(Synthesis of Polyimide Precursor)

A polyimide precursor was prepared in the same manner as in Comparative Example 1 except that CBDA and BPDA were used as acid dianhydrides.

(Preparation of Polyimide Film)

5% of 3,5-lutidine with respect to a solid content of the polyimide precursor was added, and DMF was added such that a solid content concentration became 15%, and the mixture was stirred to obtain a homogeneous solution. This solution was applied on a non-alkali glass plate using a comma coater and was dried in an air atmosphere at 40° C. for 10 minutes, at 80° C. for 30 minutes and at 150° C. for 30 minutes. Thereafter, using an inert oven, heating was performed at 260 for 1 hour under a nitrogen atmosphere to obtain a polyimide film having a thickness of 30 µm.

Comparative Example 5

A polyimide film having a thickness of 30 µm was prepared from a polyimide solution in the same manner as in Example 1 except that CBDA and hydrogenated pyromellitic acid dianhydride (PMDA-HS manufactured by Iwatani Gas Co., Ltd.) were used as acid dianhydrides.

Comparative Example 6

A polyimide film having a thickness of 30 µm was prepared from a polyamide acid solution in the same manner as in Comparative Example 1 except that CBDA and 6FDA were used as acid dianhydrides.

Compositions, solubilities, and film evaluation results of the polyimide resins of Examples and Comparative Examples are shown in Table 1.

TABLE 1

| | Monomer Composition | | | | | | | Film Characteristics | | | | | |
| | Acid Dianhydride | | | | Diamine | | | | Yellow- | | Trans- | Total Light | |
| | CBDA mol % | PMDA-HS mol % | BPDA mol % | 6FDA mol % | TFMB mol % | 3,3'-DDS mol % | Solubility | Elastic Modulus GPa | ness (YI) | Pencil Hardness | mittance (400 nm) % | Trans- mittance % | Tg ° C. |
|---|---|---|---|---|---|---|---|---|---|---|---|---|---|
| Example 1 | 65 | — | — | 35 | 70 | 30 | OK | 4.5 | 1.8 | 5H | 85.5 | 91.5 | 315 |
| Example 2 | 60 | — | — | 40 | 70 | 30 | OK | 4.3 | 1.8 | 4H | 79.8 | 91.2 | — |
| Comparative Example 1 | — | — | 100 | — | 100 | — | NG | 7.6 | 14.8 | 5H | 10.0 | 86.3 | 293 |
| Comparative Example 2 | — | — | — | 100 | 100 | — | OK | 3.3 | 22.1 | F | 80.3 | 91.2 | 319 |
| Comparative Example 3 | — | — | 50 | 50 | 100 | — | NG | 3.5 | 3.3 | 4H | 45.3 | 91.5 | 307 |
| Comparative Example 4 | 80 | — | 20 | — | 100 | — | NG | 5.2 | 3.0 | 6H | 64.8 | 90.4 | 362 |

TABLE 1-continued

| | Monomer Composition | | | | | | | Film Characteristics | | | | | |
| | Acid Dianhydride | | | | Diamine | | | Elastic | Yellow-ness | Pencil | Trans-mittance | Total Light Trans- | |
| | CBDA mol % | PMDA-HS mol % | BPDA mol % | 6FDA mol % | TFMB mol % | 3,3'-DDS mol % | Solu-bility | Modulus GPa | (YI) | Hardness | (400 nm) % | mittance % | Tg °C. |
|---|---|---|---|---|---|---|---|---|---|---|---|---|---|
| Comparative Example 5 | 30 | 70 | — | — | 100 | — | OK | 3.7 | 1.5 | H | 85.7 | 92.1 | — |
| Comparative Example 6 | 65 | — | — | 35 | 100 | — | NG | 4.4 | 1.6 | 4H | 83.1 | 91.4 | — |

What is claimed is:

1. A polyimide resin having a structure derived from an acid dianhydride and a structure derived from a diamine,
   wherein the diamine comprises 3,3'-diaminodiphenyl sulfone and bis(trifluoromethyl)benzidine such that an amount of the 3,3'-diaminodiphenyl sulfone, with respect to a total amount of the diamine, is from 20 to 50 mol %, and
   the acid dianhydride comprises 1,2,3,4-cyclobutane tetracarboxylic acid dianhydride and 2,2-bis (3,4-dicarboxyphenyl)-1,1,1,3,3,3-hexafluoropropane dianhydride such that an amount of the 1,2,3,4-cyclobutane tetracarboxylic acid dianhydride, with respect to a total amount of the acid dianhydride, is from 55 to 75 mol % a sulfonyl group containing diamine.

2. The polyimide resin according to claim 1, wherein an amount of bis(trifluoromethyl)benzidine, with respect to the total amount of the diamine, is from 50 to 80 mol %.

3. The polyimide resin according to claim 1, wherein an amount of 2,2-bis(3,4-dicarboxyphenyl)-1,1,1,3,3,3-hexafluoropropane dianhydride, with respect to the total amount of the acid dianhydride, is from 25 to 45 mol %.

4. A polyimide solution, obtained by dissolving the polyimide resin according to claim 1 in a solvent.

5. A film, comprising:
   the polyimide resin according to claim 1.

6. The film according to claim 5 having a yellowness of 3.0 or less.

7. The film according to claim 5 having a tensile elastic modulus of 3.5 GPa or more and a pencil hardness of 4H or more.

8. The film according to claim 5 having a light transmittance of 60% or more at a wavelength of 400 nm.

9. The film according to claim 5 having a glass transition temperature of 300° C. or higher.

10. A method for producing a film, comprising:
    applying the polyimide solution according to claim 4 on a substrate; and
    removing the solvent.

* * * * *